United States Patent Office 3,790,503
Patented Feb. 5, 1974

3,790,503
METHOD OF MANUFACTURING A
GERMANIUM CATALYST
Daniel E. McCartney, Mount Prospect, and Roy T.
Mitsche, Island Lake, Ill., assignors to Universal Oil
Products Company, Des Plaines, Ill.
No Drawing. Continuation-in-part of abandoned application Ser. No. 17,862, Mar. 9, 1970. This application Mar. 27, 1972, Ser. No. 238,616
Int. Cl. B01j 11/06, 11/12
U.S. Cl. 252—442
12 Claims

ABSTRACT OF THE DISCLOSURE

A method of catalyst manufacture. An aqueous solution of a weak base and a germanium compound is dissolved in an acidic alumina sol at below gelation temperature and the resulting mixture treated at an elevated temperature effecting hydrolysis of the weak base and gelation of the mixture. The weak base is preferably hexamethylenetetramine and the germanium compound is germanium dioxide or a compound hydrolyzable thereto. The product is further composited with a platinum group metal to yield an improved reforming catalyst.

---

This application is a continuation-in-part application of a copending application Ser. No. 17,862, filed Mar. 9, 1970, now abandoned.

The reforming of gasoline boiling range feed stocks to improve the octane rating thereof is a process well-known to the petroleum industry. The feed stock may be a full boiling range gasoline fraction boiling in the 50°–425° F. range although it is more often what is commonly called naphtha—a gasoline fraction characterized by an initial boiling point of from about 150° to about 250° F. and an end boiling point of from about 350° to about 425° F.

The reforming of gasoline boiling range feed stocks is generally recognized as involving a number of octane-improving hydrocarbon conversion reactions requiring a multi-functional catalyst. In particular, the catalyst is designed to effect several octane-improving reactions with respect to paraffins and naphthenes—the feed stock components that offer the greatest potential for octane improvement. Thus, the catalyst is designed to effect isomerization, dehydrogenation, dehydrocyclization and hydrocracking of paraffins. Of these hydrocarbon conversion reactions, dehydrocyclization produces the greatest gain in octane value and is therefore a favored reaction. For naphthenes, the principal octane-improving reactions involve dehydrogenation and ring isomerization to yield aromatics of improved octane value. With most naphthenes being in the 65–80 F–1 clear octane range, the octane improvement, while substantial, is not as dramatic as in the case of the lower octane paraffins. Reforming operations thus employ a multi-functional catalyst designed to provide the most favorable balance between the aforementioned octane-improving reactions to yield a product of optimum octane value, said catalyst having at least one metallic dehydrogenation component and an acid-acting hydrocracking component.

However, even with the achievement of a desired balance between the octane-improving reactions, problems persist relating principally to undesirable side reactions which, although minimal, cumulatively contribute to carbon formation, catalyst instability and product loss. Thus, dimethylation occurs with the formation of excess methane; excessive hydrocracking produces light gases; cleavage or ring opening of naphthenes results in the formation of low octane, straight chain hydrocarbons; condensation of aromatics forms coke precursors and carbonaceous deposits; and the acid catalyzed polymerization of olefins and other polymerizable materials yield high molecular weight hydrocarbons subject to dehydrogenation and further formation of carbonaceous matter.

Accordingly, an effective reforming operation is dependent on the proper seltcion of catalyst and process variables to minimize the effect of undesirable side reactions for a particular hydrocarbon feed stock. However, the selection is complicated by the fact that there is an inter-relation between reaction conditions relating to undesirable side reactions and desirable octane-improving reactions, and reaction conditions selected to optimize a particular octane-improving reaction may, and often does, also promote one or more undesirable side reactions. For example, as previously indicated, some hydrocracking is desirable since it produces lower boiling hydrocarbons of higher octane value than the parent hydrocarbons. But hydrocracking of the lower boiling $C_6$–$C_8$ constituents is not desirable since it produces still lower boiling hydrocarbons, such as butane, which are of marginal utility. It is this type of hydrocracking that is referred to as excessive hydrocracking and to be avoided. The extent and kind of hydrocracking is controlled by careful regulation of the acid-acting component of the catalyst and by the use of low hydrogen partial pressures. The latter follows from the fact that the hydrocracking reaction consumes hydrogen and the reaction can therefore be controlled by limiting hydrogen concentration in the reaction media. Low hydrogen partial pressures have a further advantage in that the main octane-improving reactions, i.e., dehydrogenation of paraffins and naphthenes, are net producers of hydrogen and, as such, favored by low hydrogen pressures.

Catalysts comprising a supported platinum group metal, for example, platinum supported on alumina, are widely known for their selectivity in the production of high octane aromatics, general activity with respect to each of the several octane-improving reactions which make up the reforming operation, and for their stability at reforming conditions. One of the principal objections to low pressure reforming relates to its effect on catalyst stability. This stems from the fact that low pressure operation tends to favor the aforemenioned condensation and polymerization reactions believed to be the principal reactions involved in the formation of coke precursors and carbon deposits so detrimental to catalyst stability.

It is an object of this invention to present an improved reforming catalyst, particularly suitable for low pressure reforming and characterized by a novel method of preparation. As will become apparent with reference to the following detailed specification, the catalyst composition of this invention comprises a composite of germanium and a refractory inorganic oxide containing a platinum group metal component and a halogen component.

In one of its broad aspects, the present invention embodies a method of preparing germanium composited with a refractory inorganic oxide which comprises forming an aqueous solution of a weak base and a germanium compound selected from the group consisting of germanium dioxide and compounds hydrolyzable thereto, said weak base being substantially stable at normal temperatures and hydrolyzable to ammonia at a controlled rate with increasing temperature; dissolving said solution in an acidic refractory inorganic oxide hydrosol at below gelation temperature; subjecting the resultant hydrosol to an elevated temperature effecting hydrolysis of said weak base and gelation of the hydrosol.

One of the more specific embodiments of this invention relates to a method of preparing a reforming catalyst composition which comprises forming an aqueous solution of germanium dioxide and hexamethylenetetramine; dissolving said solution in an aluminum cloridehydrosol at below gelation temperature; dispersing the resultant mixture as droplets in an oil bath maintained at a temperature of from about 120° to about 220° F. and retaining said droplets therein until they set to spheroidal hydrogel particles; washing, drying and calcining said particles, and impregnating the same with an aqueous solution of chloroplatinic acid; calcining the resultant spheroidal particles and recovering a reforming catalyst composition comprising a composite of germanium and alumina containing a platinum component and a chloride component.

Other objects and embodiments of this invention will become apparent in the following detailed specification.

In accordance with the method of manufacture of this invention, a germanium compound is prepared in aqueous solution with a weak base and the solution dissolved in an acidic inorganic oxide hydrosol, the resultant hydrosol being thereafter treated at conditions effecting gelation. Suitable germanium compounds include germanium dioxide and germanium compounds hydrolyzable to germanium dioxide in alkaline solution, for example, germanium dichloride, germanium tetrachloride, germanium oxychloride, germanium sulfide, germanium disulfide, germanium imide, and the like.

The acidic refractory inorganic oxide hydrosol may comprise alumina, silica, zirconia, thoria, boria, etc., or mixtures thereof such as alumina-silica, alumina-zirconia, alumina-boria, and the like, the acidic hydrosol being typically prepared by digesting a suitable metal or metal compound in aqueous acidic solution. A catalyst composition comprising germanium composited with alumina is particularly useful for reforming in combination with other catalytic components as hereinafter described. A preferred acidic alumina hydrosol is prepared by digesting aluminum metal in aqueous hydrochloric acid and/or aluminum chloride solution, said hydrosol being frequently referred to as an aluminum chloride hydrosol.

In order to achieve an optimum distribution of the germanium component in the alumina, or other refractory inorganic oxide carrier material as herein contemplated, the weak base must be effective not only to solubilize the selected germanium compound in aqueous solution, but also, upon subsequent admixture with the acidic hydrosol, to effect substantially complete solution of the germanium compound therein at normal temperatures, say less than about 60° F., without effecting any substantial degree of gelation. Further, the weak base must be hydrolyzable or decomposable to ammonia at a controlled rate with increasing temperature whereby gelation is effected within a reasonable time under controlled conditions to develop desirable physical properties of the gelation product as will hereinafter appear. Certain organic amines or amides, notably hexamethylenetetramine, urea, and mixtures thereof, are preferably employed as a weak base in accordance with the method of this invention. Thus, in a preferred embodiment of this invention relating to the manufacture of a spheriodal catalyst composition comprising germanium and alumina, germanium dioxide in aqueous solution with organic amine is dissolved in an aluminum chloride hydrosol at below gelation temperature, the mixture being thereafter formed into spheroidal hydrogel particles by the well-known oil-drop method substantially as described by J. Hoekstra in U.S. Pat. No. 2,620,314.

In the preparation of the aqueous solution subsequently commingled with the acidic hydrosol, the organic amine is utilized in an amount to effect substantially complete neutralization of the acid anion contained in the acidic hydrosol upon total hydrolysis of said amine. For example, hexamethylenetetramine is utilized in an amount to effect substantially complete neutralization of the chloride anion contained in an aluminum chloride hydrosol, and preferably in an amount corresponding to from about a 1:4 to about a 1.25:4 mole ratio with said chloride anion. Further, the germanium compound and organic amine concentration of said aqueous solution is such that upon dissolving the solution in the acidic hydrosol, the resulting hydrosol will contain from about 6 to about 10 wt. percent metals (germanium plus aluminum).

In the preparation of said aqueous solution, the germanium compound can be utilized and solubilized in an amount sufficient to provide a final catalyst composition comprising up to about 10 wt. percent germanium, the amount and concentration of the hexamethylenetetramine in said solution being substantially as described. Preferably, the final catalyst composition is prepared to contain from about 0.1 to about 1.0 wt. percent germanium.

The aforementioned oil-drop method affords a convenient means of developing desirable physical properties of the final catalyst composition, said physical properties preferably including an average bulk density of from about 0.3 to about 0.8 grams per cubic centimeter, an average pore diameter of from about 20 to about 300 Angstroms, an average pore volume of from about 0.10 to about 1.0 cubic centimeters per gram, and a surface area of from about 150 to about 500 square meters per gram. Thus, an aluminum chloride hydrosol suitably prepared by digesting aluminum pellets in aqueous hydrochloric acid, is commingled with the germanium-organic amine solution and the resulting hydrosol dispersed as droplets into a hot oil bath. In this type of operation, the organic amine component of the mixture, being substantially stable at normal temperatures, functions as an ammonia precursor, ammonia being gradually released upon hydrolysis or decomposition with increasing temperature. Thus, the hydrosol is commingled with a germanium-organic amine solution at below gelation temperature—usually less than about 60° F.—and the resulting hydrosol dispersed as droplets by means of a nozzle or rotating disk into a hot oil bath whereby gelation occurs with the formation of spheroidal hydrogel particles. The hot oil bath is suitably maintained at an elevated temperature of from about 120° to about 220° F. In this type of operation, the acidic hydrosol is set chemically, utilizing ammonia as a neutralizing or setting agent, the ammonia being furnished by the organic amine, preferably hexamethylenetetramine, included in the hydrosol. Only a fraction of the organic amine is hydrolyzed or decomposed in the relatively short period during which the initial gelation occurs. During the subsequent aging process, the residual amine retained in the spheroidal hydrogel particles continues to hydrolyze and effect further polymerization of the hydrogel particles whereby the pore characteristics of the material are established. The hydrogel particles are aged, usually for a period of from about 10 to about 24 hours, at a predetermined temperature, usually from about 120° to about 220° F., and at a predetermined pH value. The aging time may be substantially reduced utilizing pressure aging techniques. After the aging treatment, the spheroidal particles are washed in any suitable manner. A particularly satisfactory method comprises washing the particles by percolation, either with an upward or downward flow of water, and preferably with water containing a small amount of ammonium hydroxide. After washing, the particles may be dried at a temperature of from about 200° to about 600° F. for from about 2 to about 24 hours or more, or dried at this temperature and calcined at a temperature of from about 800° to about 1500° F. for from about 2 to about 12 hours or more. As previously stated, the foregoing method affords a convenient means of developing desired physical characteristics of the final catalyst composition. The method includes a number of process variables which effect the physical properties of the final catalyst composition. Generally, the aluminum/chloride mole ratio of the acidic aluminum hydrosol will influence the apparent bulk density and, correspondingly, the pore volume and pore diameter characteristics attendant therewith, lower ratios tending toward higher apparent bulk densities. Other process variables effecting the physical properties of the catalyst include the time, temperature and pH at which the alumina particles are aged. Usually temperatures in the lower range and the shorter aging periods tend toward higher apparent bulk densities. Surface area properties are normally a function of calcination temperature, the aforesaid temperature of from about 800° to about 1500° F. being suitably employed.

The catalyst composition of this invention further contains a platinum group metal component. While the platinum group metals include platinum, palladium, rhodium, ruthenium, osmium and iridium, platinum is a preferred catalyst component. The platinum group metal component is preferably incorporated in the catalyst composition by impregnation techniques. For example, the germanium-alumina composite prepared by the method of this invention is suspended, dipped, soaked or otherwise immersed in an aqueous solution of a soluble platinum group metal compound. Suitable compounds include platinum chloride, chloroplatinic acid, ammonium chloroplatinate, dinitrodiamino platinum, palladium chloride, chloropalladic acid, and the like. The utilization of a platinum group metal in combination with halogen, such as chloroplatinic acid, is preferred as it facilitates the incorporation of both the platinum group metal and at least a portion of the halogen component in the catalyst composition. Hydrochloric acid is also generally added to the impregnating solution in order to further facilitate the incorporation of the halogen component in the catalyst composition. The catalyst composition is prepared to contain from about 0.1 to about 1.0 wt. percent platinum group metal.

The catalyst composition of this invention also contains halogen in a combined form, e.g., as a chloride, whereby a desired degree of acidity is imparted to the catalyst composition to influence the reforming reaction. The combined halogen may be either chlorine, fluorine, bromine, iodine, or mixtures thereof. Of these fluorine, and particularly chlorine, are preferred for the purposes of this invention. In any case, the selected halogen component comprises from about 0.1 to about 1.5 wt. percent, and preferably from about 0.4 to about 0.9 wt. percent, of the final catalyst composition. Where necessary, the catalyst composition may be further treated with an appropriate halogen acid to add additional halogen, or treated with steam to lower the halogen concentration. Also, as has been mentioned, the halogen component, or a portion thereof, may be included in the catalyst composition incidental to the incorporation of the platinum group metal, for example, through utilization of an aqueous chloroplatinic acid impregnating solution.

In one preferred embodiment of this invention, the catalyst composition is prepared to contain from about 0.1 to about 1.0 wt. percent rhenium. The rhenium component may be incorporated in the catalyst composition in any conventional or convenient manner and at any stage in the manufacture thereof. One suitable method involves impregnation of the germanium-alumina composition with an aqueous solution of a soluble rhenium compound either before, after or during incorporation of the other components heretofore described. Suitable rhenium compounds include ammonium perrhenate, sodium perrhenate, potassium perrhenate, rhenium chloride, perrhenic acid, and the like. Preferably, the rhenium component is impregnated with the platinum group metal component utilizing a common impregnating solution comprising, for example, chloroplatinic acid and perrhenic acid in aqueous solution.

Following the deposition of the metallic components and the halogen component with the germanium-refractory inorganic oxide composite, the final catalyst composition generally will be dried at a temperature of from about 200° to about 600° F. for a period of from about 2 to about 24 hours or more and finally calcined at a temperature of from about 350° to about 1400° F. in an oxidizing atmosphere to convert the metallic components substantially to the oxide form. Preferably, the catalyst composition is initially calcined for about one-half hour at a temperature of from about 350° to about 600° F. and thereafter for at least about one hour at a temperature of from about 700° to about 1400° F. In the case where a halogen component is utilized in the catalyst, best results are generally obtained when the halogen content of the catalyst is adjusted during the calcination step by including a halogen, or a halogen-containing compound, in the oxidizing atmosphere. In particular, when the halogen component of the catalyst is chlorine, it is preferred to use a mole ratio of $H_2O$ to HCl of from about 20:1 to about 100:1 during at least a portion of the calcination step in order to adjust the final halogen content of the catalyst in the range of from about 0.1 to about 1.5 wt. percent.

Although it is not essential, it is preferred that the resultant calcined catalyst composition be subjected to a substantially water-free reduction step prior to its use in the conversion of hydrocarbons. This step is designed to insure a uniform and finely divided dispersion of the metallic components throughout the carrier material. Preferably, substantially pure and dry hydrogen (i.e., less than 20 volume p.p.m. $H_2O$) is used as the reducing agent in this step. The reducing agent is contacted with the calcined catalyst composition at a temperature of from about 800° to about 1200° F. for a period of from about 0.5 to about 10 hours or more. This reduction treatment may be performed in situ as part of a start-up sequence if precautions are taken to pre-dry the plant to a substantially water-free state and if substantially water-free hydrogen is used.

The resulting reduced catalyst composition may, in some cases, be beneficially subjected to a pre-sulfiding treatment designed to incorporate from about 0.05 to about 0.50 wt. percent sulfur in the catalyst composition. Preferably this pre-sulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas, such as a mixture of hydrogen and hydrogen sulfide having from about 10 moles of hydrogen per mole of hydrogen sulfide at conditions sufficient to effect the desired incorporation of sulfur, generally including a temperature of from about 50° to about 1100° F. or more. It is generally a good practice to perform this presulfiding step under substantially water-free conditions.

The present invention embodies a process for reforming a gasoline fraction which process comprises contacting said gasoline fraction, in admixture with hydrogen, with the catalyst composition of this invention at reforming conditions. The preferred charge stocks are those consisting predominantly of aromatics, naphthenes, and paraffins, although minor amounts of olefins may be present. This preferred class includes straight-run gasoline, natural gasoline, and the like. The gasoline fraction may be a full boiling range gasoline having an initial boiling point of from about 50 to about 105° F. and an end boiling point of from about 285° F. to about 425° F., or it may be a selected fraction thereof which usually is the higher boiling naphtha fraction having an initial boiling point of from about 150° to about 250° F. and an end boiling point of from about 350° to about 425° F.

Reforming conditions herein contemplated include an imposed pressure of from about 50 to about 500 p.s.i.g., preferably from about 75 to about 200 p.s.i.g., and an elevated temperature of from about 795° to about 1060° F. A hydrogen-rich gas, principally a recycle gas comprising in excess of about 80% hydrogen, is admixed with the selected hydrocarbon charge stock to provide a hydrogen/hydrocarbon mole ratio of from about 2 to about 20. The hydrocarbon charge stock in admixture with hydrogen is generally pre-heated to the desired reaction temperature and passed into contact with the catalyst contained in the reaction zone. The hydrocarbon charge stock is passed in contact with the catalyst at a liquid hourly space velocity (LHSV), defined as the volume of liquid hydrocarbon charged per hour per volume of catalyst contained in the reaction zone, of from about 0.5 to about 10, a LHSV of from about 1.0 to about 4.0 being preferred. The reaction zone effluent is recovered in a high pressure-low temperature receiver or separator whereby a hydogen-rich gaseous phase is separated and recycled, in part, to the reaction zone in admixture with the hydrocarbon charged thereto.

The catalyst composition of this invention is advantageously employed in a substantially water-free environment. It is therefore desirable to maintain the water content of the hydrocarbon charge stock at less than about 20 p.p.m. It is further desirable to dry the hydrogen recycle stream so as to contain less than about 10 p.p.m. water. In view of the valuable catalyst composition involved, it is preferred to effect the reforming operation in a fixed bed catalyst system to obviate attrition losses otherwise incurred. However, other systems including the moving bed and fluidized bed systems may be employed.

Although the catalyst composition of this invention is most suitable for reforming, it may be used to promote other reactions including dehydrogenation of specific hydrocarbons or hydrocarbon fractions, isomerization of specific hydrocarbons or hydrocarbon fractions, destructive hydrogenation or hydrocracking of larger hydrocarbon molecules such as those occurring in the kerosine and gas oil boiling range, and the oxidation of hydrocarbons to produce first, second, and third stage oxidation products. Reaction conditions employed in the various hydrocarbon conversion reactions are those heretofore practiced in the art. For example, alkylaromatic isomerization reaction conditions include a temperature of from about 32° to about 1000° F., a pressure of from about atmospheric to about 1500 p.s.i.g., a hydrogen to hydrocarbon mole ratio of from about 0.5:1 to about 20:1, and a LHSV of from about 0.5 to about 20. Likewise, typical hydrocracking reaction conditions include a pressure of from about 500 p.s.i.g. to about 3000 p.s.i.g., a temperature of from about 390° to about 935° F., a LHSV of from about 0.1 to about 10, and a hydrogen circulation rate of from about 1000 to about 10,000 s.c.f./bbl. (standard cubic feet per barrel of charge).

Heretofore, in the manufacture of germanium promoted catalysts as herein contemplated, the limited solubility of germanium dioxide in acidic solution has precluded an optimum distribution thereof in an acidic hydrosol prior to gelation. This is so since a considerable amount of the germanium dioxide exists as a suspension in the acidic hydrosol rather than a true solution. By the addition method of this invention this problem has been overcome. Thus, although germanium dioxide is per se substantially insoluble in the acidic hydrosol, it is readily soluble in solution with the weak base of this invention, and the germanium dioxide remains in solution upon subsequent addition to the acidic hydrosol. The end result is a more uniform distribution of the germanium component in the final catalyst product. In addition, substantially less germanium dioxide is lost in the manufacturing process. It will therefore be appreciated that the weak base, e.g. hexamethylenetetramine, provides the dual function of (1) solubilizing the germanium dioxide in the acidic hydrosol, and (2) affording a progressive gelation of the resulting hydrosol, including aging, by the gradual release of ammonia and neutralization of the acid anion content thereof to yield a catalyst composite of desired physical characteristics.

The following examples are presented in illustration of certain preferred embodiments of this invention and are not intended as an undue limitation of the generally broad scope of the invention as set out in the appended claims.

EXAMPLE I

An aluminum chloride hydrosol was prepared by digesting substantially pure aluminum pellets in aqueous hydrochloric acid. The hydrosol had a specific gravity of 1.344, an aluminum/chloride ratio of 1.15, and contained 309.5 grams of $Al_2O_3$ per liter. Germanium tetrachloride was then prepared in aqueous solution with hexamethylenetetramine by admixing 1.70 cc. (3.20 grams) of germanium tetrachloride with 700 cc. of a 28% aqueous hexamethylenetetramine solution at room temperature, and the resultant solution was dissolved in the aforesaid aluminum chloride hydrosol. The resultant hydrosol was thereafter dispersed as droplets into a hot (194° F.) oil bath to form spheroidal hydrogel particles comprising germanium and alumina. The hydrogel particles were aged overnight in the hot oil bath, aged in an ammoniacal solution for three hours, washed with a dilute ammoniacal solution and oven dried at about 392° F. The dried spheroidal particles were heated to about 1200° F. in a substantially dry air atmosphere and then calcined at 1200° F. for 2 hours in air containing about 3% water. About 370 cc. of calcined nominal 1/8" diameter spheroidal particles comprising alumina and about 0.5 wt. percent germanium were recovered. The spheroidal particles had an average bulk density of 0.482 gram per cubic centimeter.

About 350 cc. of the calcined particles was immersed in 250 cc. of impregnating solution containing 65.5 cc. of aqueous chloroplatinic acid (10 milligrams Pt./cc.) and 8.4 cc. of concentrated hydrochloric acid. The solution was then evaporated to dryness in a rotary steam evaporator.

The catalyst composition was calcined, reduced and sulfided prior to testing. The catalyst particles were calcined by heating at about 390° F. in air for ½ hour, and then at 975° F. in dry air containing 0.9 mole of HCl for 2 hours, and finally at 975° F. in dry air alone for ½ hour. After a nitrogen purge, the calcined particles were reduced by passing a stream of hydrogen diluted with nitrogen over the particles for about 20 minutes. Reduction was completed by heating the particles in hydrogen alone for 1 hour at 1050° F. The reduced particles were then sulfided for ½ hour in a stream of $H_2S$ diluted with hydrogen. Finally, the catalyst particles were treated with a stream of hydrogen for about 5 minutes and cooled to about room temperature under nitrogen.

The nominal catalyst composition, comprising 0.5 wt. percent germanium, 0.375 wt. percent platinum, 1.03 wt. percent Cl and alumina, had an average bulk density of 0.49 gram/cubic centimeter.

EXAMPLE II

A catalyst composition was prepared substantially in accordance with the method of Example I except that germanium dioxide rather than germanium tetrachloride was prepared in aqueous solution with hexamethylenetetramine. Thus, 1.55 grams of germanium dioxide was admixed with 700 cc. of a 28% aqueous hexamethylenetetramine solution and allowed to set overnight at room temperature. The resultant solution was then dissolved in 700 cc. of the aluminum chloride hydrosol and the resultant hydrosol formed into spheroidal hydrogel particles by the oil-drop method, the hydrogen particles being subsequently impregnated with platinum, calcined, reduced and sulfided, all substantially in accordance with the description of Example I. The catalyst composition comprising 0.5 wt. percent germanium, 0.375 wt. percent platinum, .94 wt. percent chloride and alumina, had an average bulk density of .52 gram/cubic centimeter.

The catalysts prepared in accordance with Example I and Example II were evaluated in a laboratory scale reforming plant comprising a reactor containing the catalyst, a hydrogen separator and a debutanizer column. In this plant, a hydrogen-rich recycle stream and the hydrocarbon charge stock were commingled and pre-heated to a desired temperature. The hydrogen charge stock was a heavy Kuwait naphtha characterized by an API gravity at 60° F. of 60.4, an F-1 clear octane rating of 40.0, and a 185-360° F. boiling range. The hydrogen-hydrocarbon mixture was passed downflow through the reactor containing the catalyst disposed in a fixed bed. The reactor effluent stream was passed through a high pressure-low temperature separator wherein a hydrogen-rich gaseous phase was separated from the liquid phase at a temperature of about 55° F. A portion of the gaseous phase was continuously passed through a high surface area sodium scrubber and the resulting substantially water-free hydrogen stream recycled to the reactor, and the excess over that required for plant pressure was recovered as excess separator gas. The liquid phase was withdrawn from the separator and passed through the debutanizer column where light ends were taken overhead as debutanizer gas, and a $C_5^+$ reformate stream recovered as bottoms.

The catalyst composition was in each case evaluated for low pressure reforming over six test periods, each test period comprising a six hour line-out period followed by a ten hour test period at constant temperature during which time the $C_5^+$ reformate product was collected. Reforming conditions included a constant reactor inlet temperature of about 963° F. for the first three test periods and a constant temperature of about 997° F. for the remaining periods. Reforming conditions further included a liquid hourly space velocity of about 3.0, a reactor outlet pressure of 100 p.s.i.g., and a hydrogen/hydrocarbon mole ratio of about 10:1. The test results are tabulated below for each period in terms of reactor inlet temperature, net excess separator gas, debutanizer overhead gas, ratio of debutanizer gas make to total gas make, and the F-1 clear octane number of $C_5^+$ reformate product.

CATALYST OF EXAMPLE I

| Period No. | T.,° F. | Separator gas, s.c.f./bbl. | Debutanizer gas, s.c.f./bbl. | Debut gas/total gas ratio | Octane No. F-1 clear |
|---|---|---|---|---|---|
| 1 | 973 | 1,617 | 61 | .036 | 97.7 |
| 2 | 973 | 1,575 | 61 | .037 | 97.3 |
| 3 | 973 | 1,528 | 61 | .038 | 96.6 |
| 4 | 1,007 | 1,726 | 69 | .039 | 99.5 |
| 5 | 1,007 | 1,665 | 67 | .038 | 98.6 |
| 6 | 1,007 | 1,602 | 68 | .041 | 97.8 |

CATALYST OF EXAMPLE II

| Period No. | T.,° F. | Separator gas, s.c.f./bbl. | Debutanizer gas, s.c.f./bbl. | Debut gas/total gas ratio | Octane No. F-1 clear |
|---|---|---|---|---|---|
| 1 | 973 | 1,682 | 63 | .036 | 99.2 |
| 2 | 973 | 1,635 | 62 | .037 | 98.4 |
| 3 | 973 | 1,614 | 60 | .036 | 97.2 |
| 4 | 1,007 | 1,783 | 66 | .036 | 100.5 |
| 5 | 1,007 | 1,749 | 66 | .036 | 100.0 |
| 6 | 1,007 | 1,680 | 68 | .039 | 99.3 |

The activity of the catalyst composition prepared by the method of this invention is apparent with reference to the unusually high octane rating of the $C_5^+$ reformate product. The separator gas make, which is roughly equivalent to net hydrogen make, is a good measure of catalyst selectivity, hydrogen being a product of the preferred octane-improving reactions, i.e., dehydrocyclization of paraffins and dehydrogenation of paraffins and naphthenes. Selectivity of the catalyst composition is further apparent with reference to debutanizer gas make, the relatively low debutanizer gas make being evidence of minimal excessive hydrocracking heretofore referred to.

In addition, at the completion of each test, the used catalyst was analyzed for carbon. The catalyst of Example I contained 3.51 wt. percent carbon while the catalyst of Example II contained 3.96 wt. percent. These results indicate the capability of the catalyst to suppress carbon formation during the reforming reaction.

We claim as our invention:

1. A method of catalyst manufacture which comprises:
   (a) forming an aqueous solution of a weak base and a germanium compound selected from the group consisting of germanium dioxide and compounds hydrolyzable to germanium dioxide, said weak base being substantially stable at normal temperatures and hydrolyzable to ammonia at a controlled rate with increasing temperature, the amount of said weak base being sufficient, upon total hydrolysis thereof, to neutralize the acid anion contained in the acidic hydrosol hereinafter specified;
   (b) dissolving said solution in an acidic refractory inorganic oxide hydrosol at below gelation temperature;
   (c) subjecting the resultant hydrosol to an elevated temperature effecting hydrolysis of said weak base and gelation of the hydrosol.

2. The method of claim 1 further characterized in that said hydrosol is an acidic alumina hydrosol.

3. The method of claim 1 further characterized in that said hydrosol is an aluminum chloride hydrosol.

4. The method of claim 1 further characterized in that said weak base is hexamethylenetetramine.

5. The method of claim 1 further characterized in that said germanium compound is a germanium tetrahalide.

6. The method of claim 1 further characterized in that said germanium compound is utilized in an amount to provide a final product containing from about 0.1 to about 1.0 wt. percent germanium.

7. The method of claim 1 further characterized in that the hydrosol of step (c) is subjected to an elevated temperature effecting hydrolysis of the weak base by dispersing the hydrosol as droplets in an oil bath maintained at a temperature of from about 120° to about 220° F. and retaining said droplets therein until they set to spherical gel particles.

8. The method of claim 7 further characterized in that said spherical particles are aged in a basic media at a temperature of from about 250° to about 500° F. and at a pressure to maintain the water content of said particles substantially in the liquid phase.

9. The method of claim 1 further characterized in that said weak base is hexamethylenetetramine and said hydrosol is an aluminum chloride hydrosol, said hexamethylenetetramine being employed in an amount to effect neutralization of the chloride anion in the hydrosol.

10. The method of claim 8 further characterized in that the aged particles are washed and dried, and calcined at a temperature of from about 800° to about 1400° F.

11. The method of claim 10 further characterized in that the calcined particles are impregnated with a soluble platinum group metal compound thermally decomposable to platinum group metal, and dried and calcined to provide a catalyst composite containing from about 0.1 to about 1.0 wt. percent germanium oxide and from about 0.1 to about 1.0 wt. percent platinum group metal.

12. The method of claim 11 further characterized in that said platinum group metal compound is chloroplatinic acid.

References Cited

UNITED STATES PATENTS

| 2,435,379 | 2/1948 | Archibald | 252—448 |
| 2,620,314 | 12/1952 | Hoekstra | 252—448 |
| 2,774,743 | 12/1956 | Hoekstra | 252—448 |
| 3,578,584 | 5/1971 | Hayes | 252—466 PT |

DANIEL E. WYMAN, Primary Examiner

W. J. SHINE, Assistant Examiner

U.S. Cl. X.R.

252—441, 448, 461, 463, 466 PT